United States Patent [19]
Yeo

[11] Patent Number: 5,887,714
[45] Date of Patent: Mar. 30, 1999

[54] PACKAGE FOR DISCS

[76] Inventor: Hock Wah Yeo, 146 11th St., San Francisco, Calif. 94103

[21] Appl. No.: 923,671

[22] Filed: Sep. 4, 1997

Related U.S. Application Data

[60] Provisional application No. 60/026,045, Sep. 13, 1996.
[51] Int. Cl.⁶ .................................................. B65D 85/57
[52] U.S. Cl. ...................................... 206/308.1; 206/312
[58] Field of Search ................................... 206/309, 310, 206/311, 312, 313, 308.1, 232

[56] References Cited

U.S. PATENT DOCUMENTS

| | | |
|---|---|---|
| D. 360,360 | 7/1995 | Kiolbasa . |
| 1,554,995 | 9/1925 | Fetters . |
| 4,793,480 | 12/1988 | Gelardi et al. . |
| 5,248,032 | 9/1993 | Sheu et al. . |
| 5,284,242 | 2/1994 | Roth et al. . |
| 5,377,827 | 1/1995 | Roth et al. . |
| 5,402,882 | 4/1995 | Bandy et al. . |
| 5,573,120 | 11/1996 | Kaufman et al. ................ 206/310 X |
| 5,613,612 | 3/1997 | Davault .............................. 206/310 X |

FOREIGN PATENT DOCUMENTS

| | | |
|---|---|---|
| 561850 | 10/1932 | Germany . |
| 2272887 | 6/1994 | United Kingdom . |
| 92/15505 | 9/1992 | WIPO . |

*Primary Examiner*—Jacob K. Ackun
*Attorney, Agent, or Firm*—Richard C. Litman

[57] ABSTRACT

A container for audio compact discs, CD-ROMs and other similarly-shaped articles having central holes used to secure the article therein and facilitate easy removal of the article therefrom. Multiple embodiments include a container having a disc-supporting base and a disc-enclosing lid, pivotally attached to each other. One end of a protruding member is pivotally attached to the base. The other end of the protruding member is free to rotate and is inserted through the central hole of the disc to be stored in the container. When the container is closed, one distinct section of the protruding member contacts the upper surface of the disc and another distinct section of the protruding member contacts the lower surface of the disc to support it and secure it in the container. Upon opening the container, vertical displacement of the protruding member automatically lifts the disc upwards off of the base, allowing easy access to the disc.

8 Claims, 6 Drawing Sheets

PACKAGE FOR DISCS

CROSS REFERENCE TO RELATED APPLICATIONS

This application claim the benefit of U.S. Provisional Application Ser. No. 60/026,045 filed Sep. 13, 1996.

BACKGROUND OF THE INVENTION

1. Field of the Invention

The present invention relates to containers for audio compact discs, CD-ROMs and other similarly-shaped articles having central holes, and more specifically to containers that secure the article therein and facilitate easy removal of the article therefrom.

2. Description of the Related Art

With the recent technological advances and the increased popularity and availability of disc-formatted information media, various devices for disc storage and protection have been developed. Folding containers fabricated of plastic, paper, or other materials have provided means to enclose the disc, thereby protecting it from damage and allowing it to be stored in an easily retrievable and secure fashion.

One type of container comprises flat, multifaceted sheets of material which are folded in an envelope-like configuration to store and protect the disc. Examples of this include U.S. Pat. No. 5,248,032 and British Patent Application No. 2,272,887 A. Another disc storage mechanism, illustrated by U.S. Pat. Nos. 5,284,242 and 5,377,827, incorporates upper and lower components that are connected with a hinge along one side, which operates to open and close the disc container. Protrusions on the interior container surface, often in the form of a circular hub, comprise an anchoring means for insertion into the disc's central hole, affording a further way of securing the stored disc. Unfortunately, manual removal of the disc from the hub requires considerable effort on the part of the user, often making disc retrieval difficult. In addition, an excessively forceful manual extraction from the hub increases the risk of damage to the disc in the event it was accidentally dropped, deformed or otherwise mishandled. In these respects, the hub storage system is inadequate.

Attempts to alleviate these problems have resulted in improvements in the art of disc containers. While retaining the hub component, disc containers designed to avoid removal-related problems featured ways for the disc to be lifted from the hub and placed on its top surface. In this way, the disc would not require forceful extraction, making disc retrieval easier. One such container requires a user to rotate its top and bottom components to free the disc from the hub. While ideal, this container proved to be of more complicated operation, and was more expensive to manufacture than conventional hub-retaining disc containers.

Furthermore, U.S. Pat. No. 5,402,882 discloses a disc container with an extractor mechanism that employs a barb affixed to its top inside surface. When the container is opened, the barb engages the bottom surface of the disc, pulling it upward and removing it from the hub automatically, and ultimately placing the disc on the top surface of the hub. While this device affords disc removal from the hub upon opening the container, it does not fully avoid the problem of forceful removal, as the extractor barb would require significant force to pull the disc off of the hub. This exertion could lead to both breakage of the barb member and damage to the disc.

U.S. Pat. No. 4,793,480 discloses an attempt to alleviate this problem by introducing a disc container with a pivotally mounted member that extends from between the juncture of the base and the lid. The extended member offers a way to retain a disc in the container, and to automatically disengage a disc from contact with the base upon opening the container. However, the extended member incorporates a hub-like clasp on which the disc is pressed when stored in the container. While the extending member automatically lifts the disc off of the base upon opening the container, the clasp-retaining mechanism on the extended member requires the user to exert force in freeing the disc therefrom; thus, the device suffers the same shortcomings as the other prior art described above.

Other less related inventions and patents include the record container of U.S. Pat. No. 1,554,995, the CD packages of U.S. Design Pat. No. Des. 360,360 and WIPO Patent No. 92/15505, and the folding device of German Patent No. 561,850.

None of the above inventions and patents, taken either singly or in combination, is seen to describe the instant invention as claimed.

SUMMARY OF THE INVENTION

The instant invention aims to provide a container for discs that overcomes the many difficulties associated with prior art disc containers. A preferred embodiment of the invention comprises a rectangular base and lid that are pivotally attached along one side. The lid is slightly longer than the base, and folds at a point proximate to the base-lid interface to define a thin rectangular section that engages the base. This arrangement allows rotational movement of the lid to facilitate the opening and closing of the container. A plurality of recesses lie within the base to support the disc. Complimentary hook and loop fasteners on the inner surfaces of the lid and base are used to secure the container in its closed position.

A segmented protruding arm engages the hinge, and extends toward the side of the base pivotally attached to the lid. The free end of the protruding member is rounded and rotates away from or towards the base when the container is open. The widest segment lies closest to the hinge, extending approximately halfway across the base and lying under the stored disc to stabilize it in the closed container. A central segment extends away from the inside surface of the base, perpendicular to the other two segments and is only of length sufficient to penetrate the disc hole. The third segment is of approximately the same length as the segment closest to the hinge, but is thinner, and lies farther from the inner surface of the base. This thin segment extends toward the lid and has a rounded tip that does not damage the disc when the thin segment is inserted through the disc hole. This segment rests on top of the disc when the container is closed, affording additional stabilization. Upon opening the container, vertical displacement of the protruding member lifts the disc off of the base, allowing easy access to the disc.

Another embodiment of the present invention comprises a base attached to a lid along a fold line on one side, and attached to another member along a fold line on the other side. This embodiment preferably is made of paper, with the base and lid having similar, rectangular shapes and the other member attached to the base having a hexagonal shape. A slit lies along the surface of the hexagonal member, and receives a tab protruding from the lid so as to comprise a lock for the container. A protruding member extends from the hexagonal member and inserts through the disc hole to securely contain the enclosed disc. Upon opening the container, vertical displacement of the protruding member lifts the disc off of the base, allowing easy access to the disc.

Still another embodiment of the present invention comprises the most-recently described embodiment, with another rectangular member pivotally attached to the lid. In the closed position, this rectangular member is folded over the lid and base to provide additional security to the disc enclosed within the container.

A third alternative embodiment comprises the container disclosed in the first alternative embodiment, with configured glue flaps pivotally attached to opposite sides of the lid and base that strengthen the lid and base. Once the glue flaps are affixed to base and lid, this embodiment operates in the manner of the first alternative embodiment described.

All embodiments described share the unique protruding member design, which secures the disc when not in use, and allows easy access to the disc upon opening the container. The operation of the protruding member relies on gravity for the displacement of the disc, whereas the hub mechanisms taught in the prior art require some forceful exertion to displace the disc from the container.

Accordingly, it is a principal object of the invention to provide a container for the storage and protection of single discs without the use of a hub.

It is another object of the invention to provide a container allowing easy removal of disc upon opening and stable fixation of the disc upon closing.

It is a further object of the invention to provide a container for discs that does not involve the exertion of excessive force in automatically or manually disengaging the disc from the member to which it is secured.

Still another object of the invention is to provide a folding disc container fabricated of plastic, paper products, or other materials with means to enclose the disc, thereby protecting it from damage and allowing it to be stored in an easily retrievable and secure fashion.

It is also an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings, when applicable to a specific embodiment of the disclosed invention.

DETAILED DESCRIPTION OF THE PREFERRED EMBODIMENTS

The present invention is referenced in the following detailed description and in the accompanying drawings in order to provide a full understanding of its features and advantages.

Figure 1:
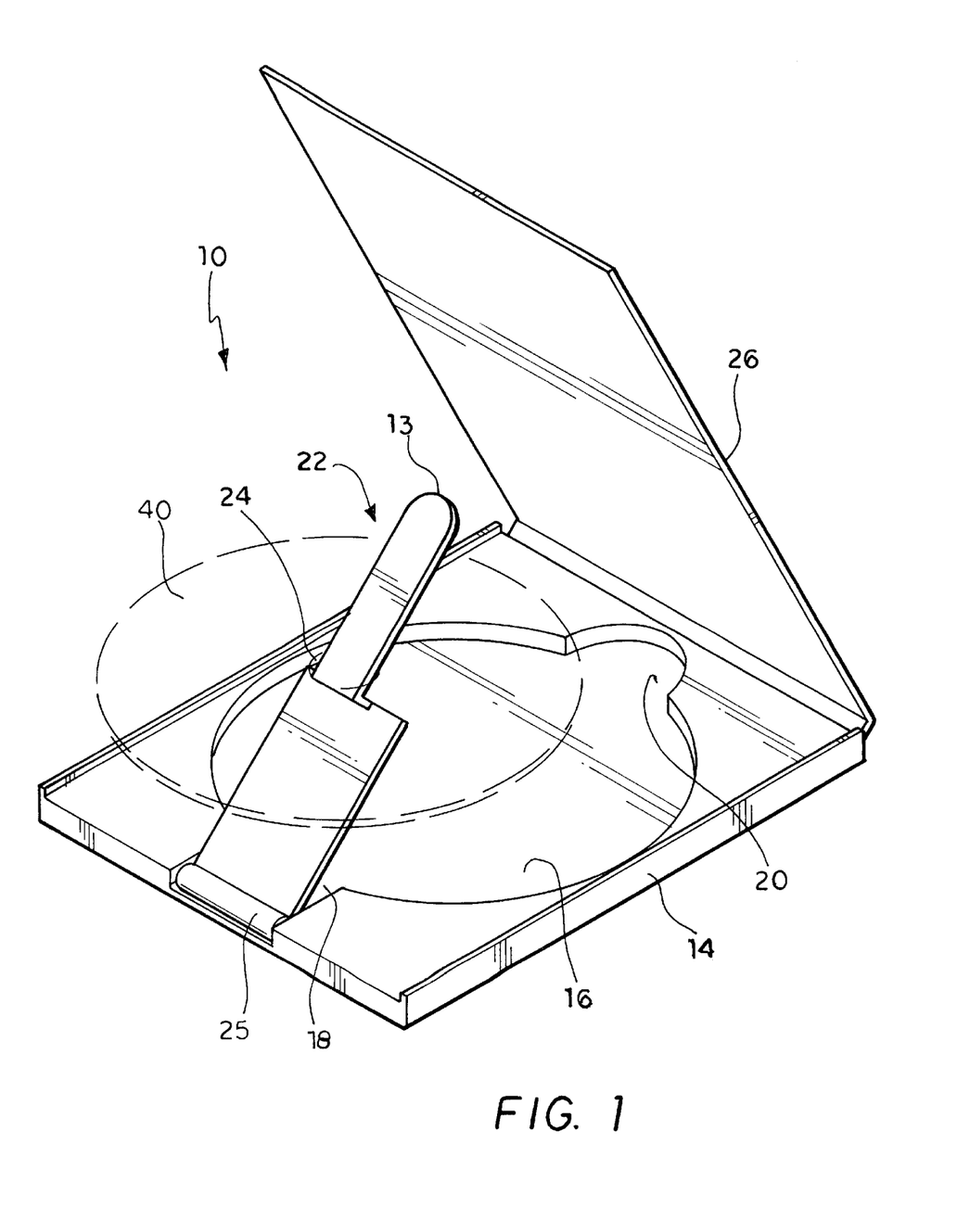
FIG. 1 is a perspective view of the preferred embodiment of the invention showing the disc container in the open position, with a disc shown in broken lines.

FIG. 1 is a perspective view of the preferred embodiment of the invention showing the disc container 10 in the open position, with a disc 40 shown in broken lines. A rectangular base 14, preferably made of plastic, features a circular recess 16, for support of the disc during storage. A rectangular recess 18 abuts the circular recess on one side of the base. A D-shaped recess 20 abuts the opposite side of the circular recess.

A rectangular lid 26 is slightly longer than the base, but is preferably made of paperboard. A fold in the portion of the lid proximate to the base-lid interface creates a thin rectangular section 28 that is affixed to the base using a laminating process. This arrangement allows rotational movement of the lid to facilitate the opening and closing of the container.

Optional circular VELCRO (hook and loop) fasteners can be affixed onto the inner surfaces of the base and lid, at the corners on the sides opposite from the base-lid interface. These VELCRO fasteners unite to lock the container, better securing it in its closed position.

Disc 40 is secured by a protruding member 22 that passes through the disc's central hole 24. A hinge 25 connects the protruding member to the inner surface of the base at rectangular recess 18. The hinge allows the protruding member to be rotated away from the base when the container is open.

Figure 2:
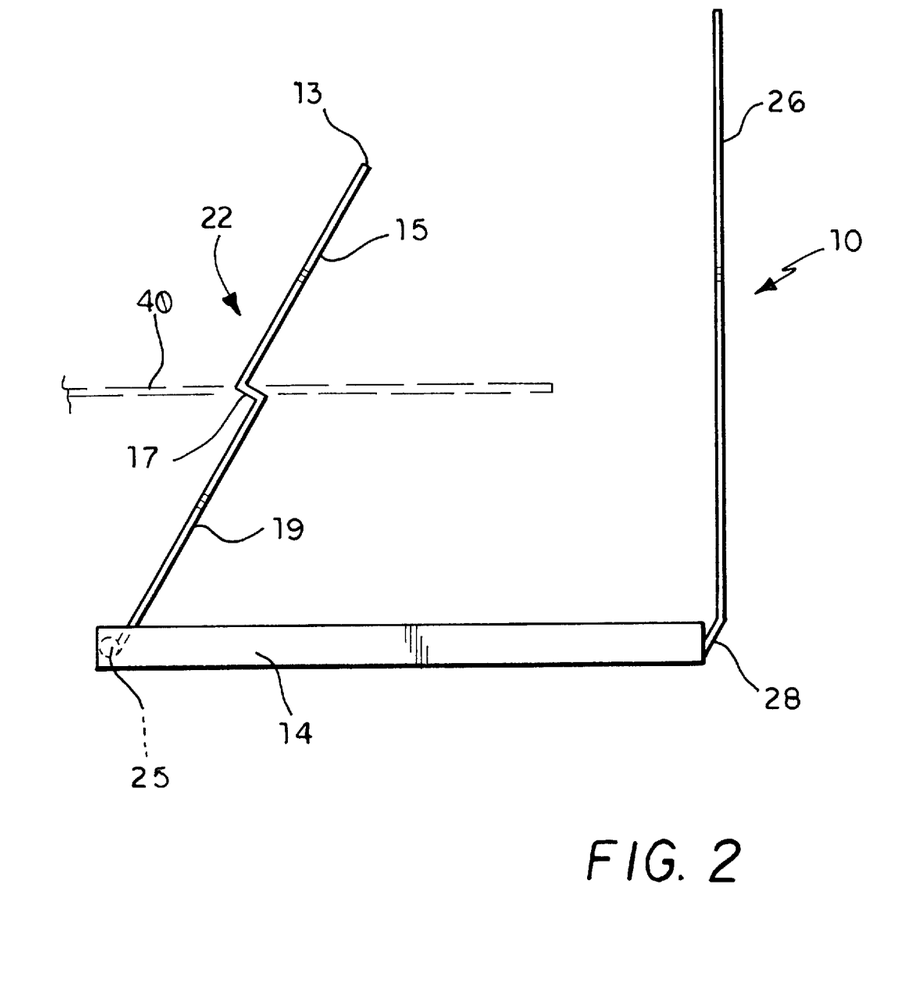
FIG. 2 is a side view illustrating the operation of the disc container in the open position, showing a disc in broken lines.

FIG. 2 is a side view illustrating the operation of the disc container in the open position, with a disc shown in broken lines. The section of the protruding member farthest displaced from the point of union with the hinge, the outer section 15, is inserted through the hole in the disc, led by the rounded tip of the protruding member 13. This section of the protruding member enters the hole from the bottom information-containing surface of the disc and passes through the hole, exiting on the top surface of the disc.

The outer and central sections of the protruding member meet at a 90 degree angle. This central section 17 extends away from the base's inside surface, and is only of length sufficient to accommodate a disc by penetrating the hole in its center. The end of the central section closest to the inside surface of the base meets another section at a 90 degree angle. This inner section 19 is of approximately the same length as the outer section, but lies closer to the inner surface of the base, and is wider than the rest of the protruding arm.

FIG. 1 illustrates how the tip of the protruding member is rounded, to avoid possible damage to the disc in removing it from or placing it onto protruding member. The central section of the protruding arm connects the outer and inner sections, and is perpendicular to these sections, as illustrated in FIG. 2.

When the protruding member is inserted through the hole of the disc, and the container is closed for storage, the outer section of the protruding member rests on top of the portion of the disc farthest from the hinge and secures it in the container. The hole in the disc center surrounds the central section of the protruding member at this time, so this section holds the disc in place within the plane of the closed container. The wider, inner section of the protruding member that does not pass through the hole in the disc lies underneath the portion of the disc closest to the hinge, thereby stabilizing the disc in the closed container.

Upon opening the container, vertical displacement of the free end of protruding member automatically lifts the disc upwards off of the base, allowing easy access to the disc. Once free of the base, the disc can be oriented to disengage its central hole from the central section of the protruding arm. Once this is done, the disc can be manually displaced along the length of the outer section of the protruding member until it is free of the member and available for use.

Figure 3:
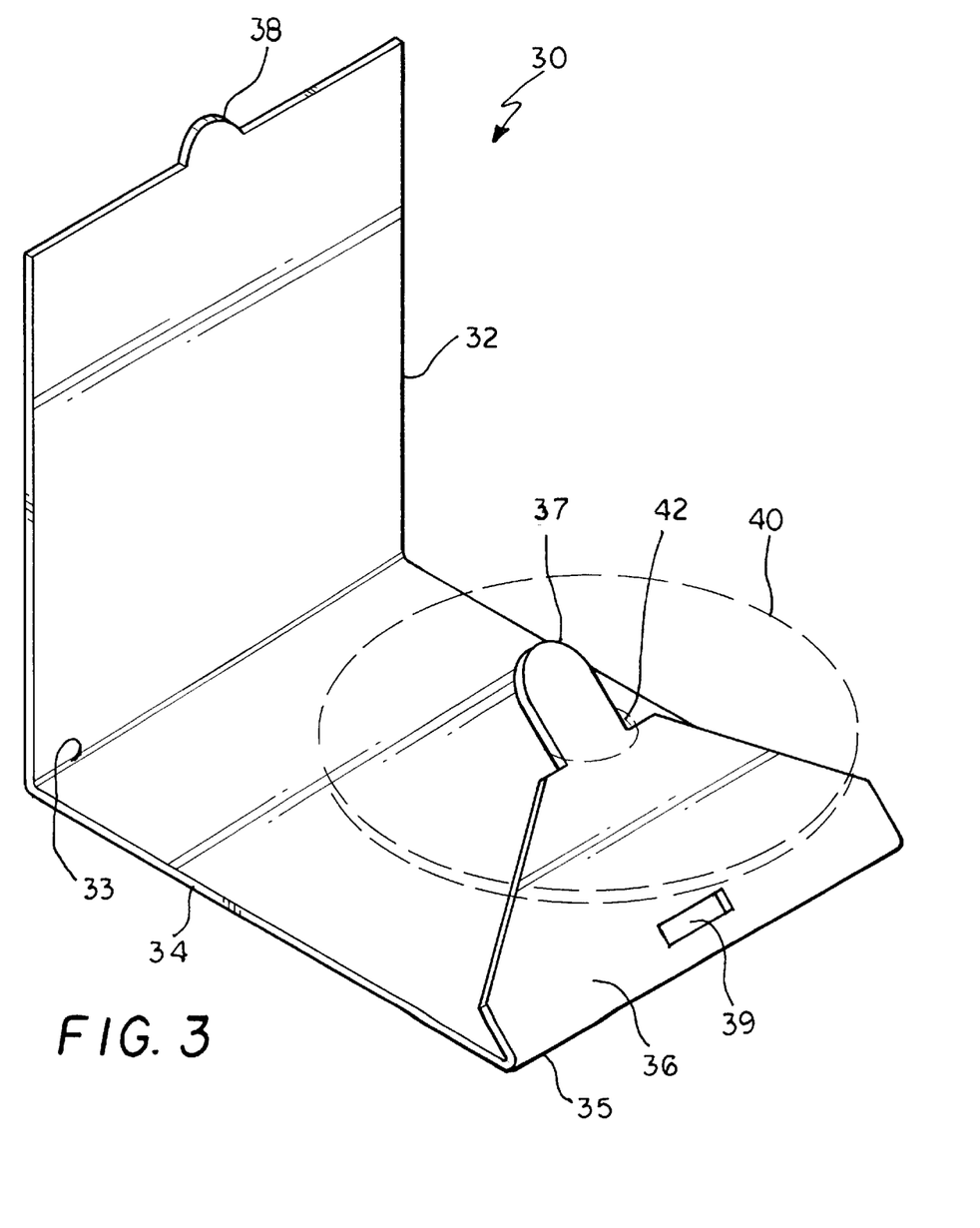
FIG. 3 is a perspective view of an alternative embodiment of the disc container in the open position, showing a disc in broken lines.

Referring now to FIG. 3, an alternate embodiment of the disc container is illustrated, referenced by number 30. The disc container in FIG. 3 is made completely of paper, preferably. A rectangular lid 32 is connected to an adjacent rectangular base 34 along fold line 33. A hexagonal member 36 adjacent to the base is connected to it along fold line 35, on the side opposite to where the lid is attached. Fold line 33 separates lid 32 from base 34 and fold line 35 separates base 34 from hexagonal member 36. Fold lines 33 and 35 also facilitate closure of the container, allowing inward rotation of the lid and hexagonal member toward base. A protruding member 37 with a rounded edge extends perpendicularly from the side of the hexagonal member parallel to and farthest from fold line 35. A tab 38 protrudes from the side of the lid parallel to and farthest from fold line 33. A slit 39 lies at the base of the hexagonal member, parallel to fold line 35, for receiving tab 38 as a means to secure the disc container upon closure.

FIG. 3 illustrates how disc 40 is placed into container 30 and secured therein, whereby the rounded edge of the protruding member is inserted through the central hole 42 in the disc. The disc is then aligned so that it is coplanar with the hexagonal member, with one distinct section of the protruding member in contact with the upper surface of the disc and another distinct section in contact with the lower surface of the disc. The hexagonal member is then rotated toward the base along fold line 36. Once the portion of the information-containing surface of the disc is in contact with the interior surface of the base, the lid is then rotated toward the base along fold line 33, until tab 38 is proximate to slit 39 and can be inserted therein to secure the disc within the container.

To remove the disc from the container, tab 38 is disengaged from slit 39, allowing the lid to be rotated away from the base to expose the disc. Vertical displacement of the protruding member of the hexagonal member automatically lifts the disc upwards off of the base, allowing easy access to the disc. Once free of the base, the disc can be oriented to disengage its central hole from the protruding arm. Once this is done, the disc can be manually displaced along the length of the protruding arm, until it is free of the member and available for use.

Figure 4:
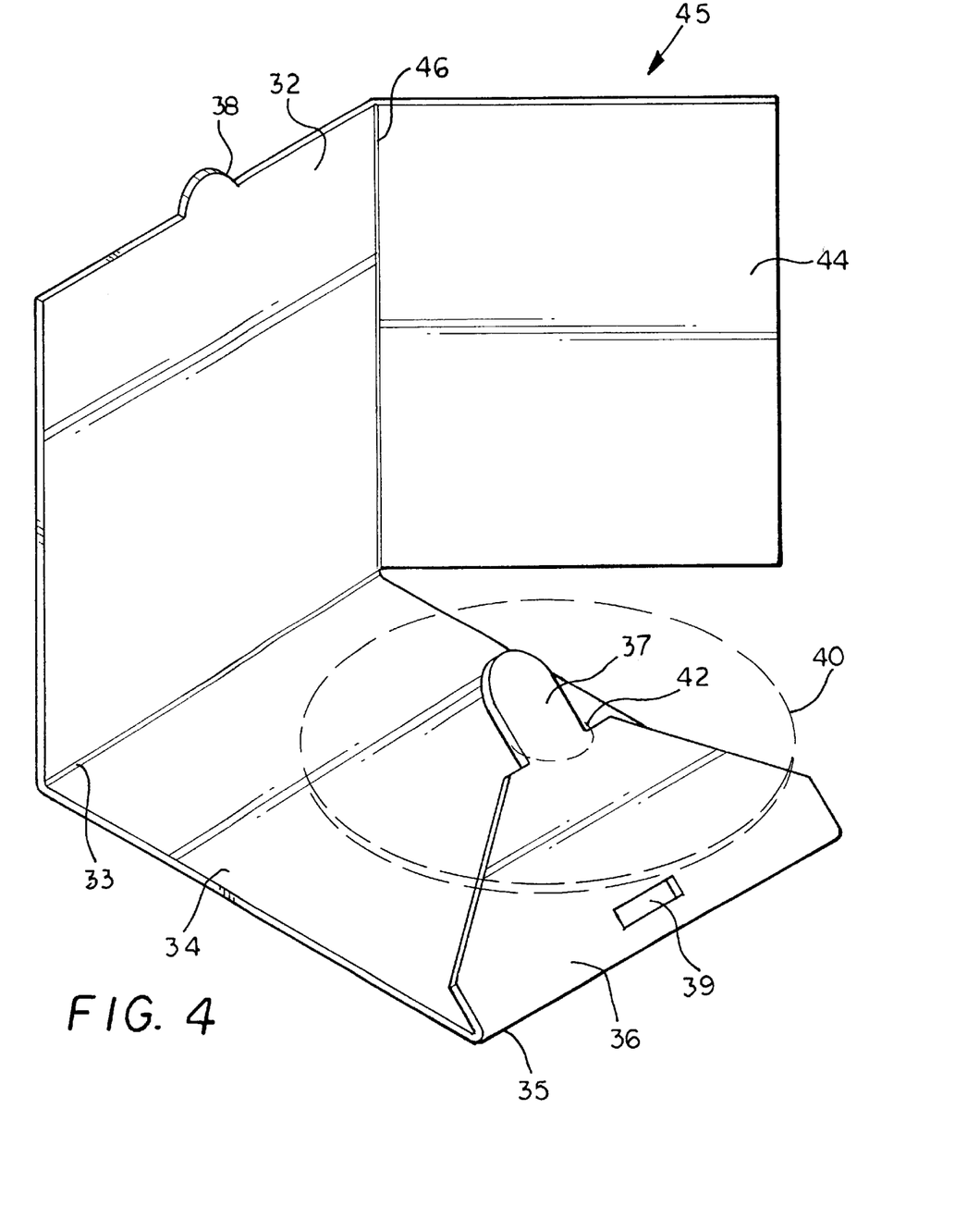
FIG. 4 is a perspective view of another alternative embodiment of the disc container in the open position, showing a disc in broken lines.
Figure 5:
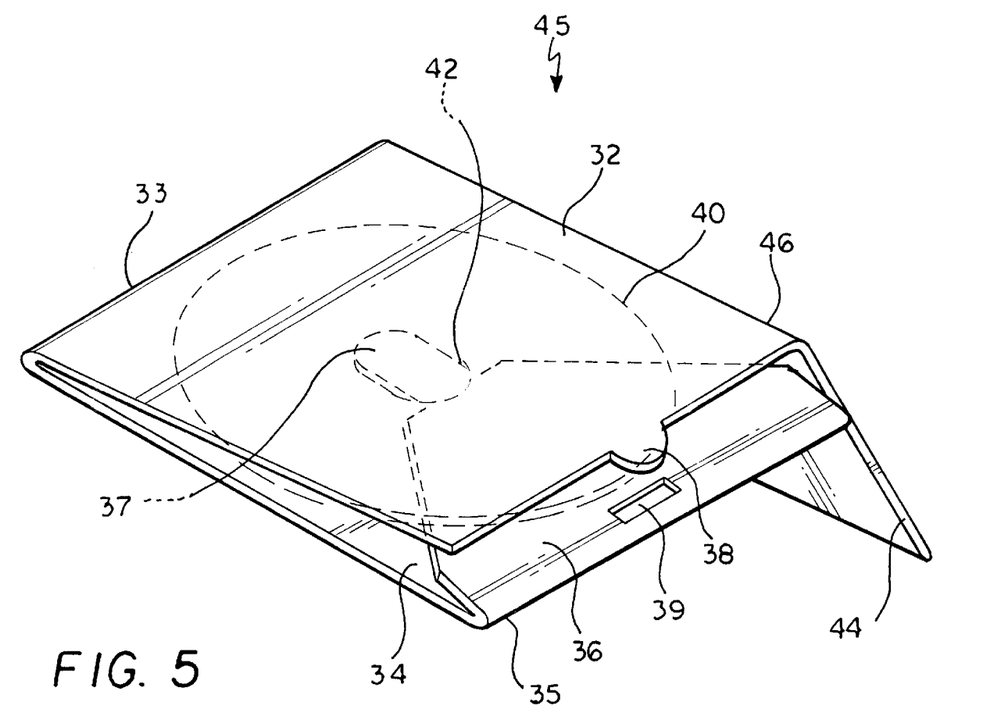
FIG. 5 is a perspective view of the disc container illustrated in FIG. 4, in the closed position, showing a disc in broken lines with the additional member being rotated.

A third embodiment of the present invention 45 is shown in FIG. 4, where an additional rectangular member 44 lies adjacent to and connected with the lid, separated by fold line 46. In this embodiment, the container is closed as in the embodiment shown in FIG. 3, with rectangular member 44 then being rotated towards the underside of the base along the interface of fold line 46 and the edge of the base. FIG. 5 illustrates this additional closure step. In the closed position, the rectangular member contacts the underside of base. The placement of the rectangular member in the closed position provides additional security to the disc enclosed within the container.

Upon opening the container, the rectangular member is rotated away from the underside of the base along the edge formed by fold line 46 and the edge of the base. The opening procedure then continues as in the embodiment illustrated by FIG. 3.

Figure 6:
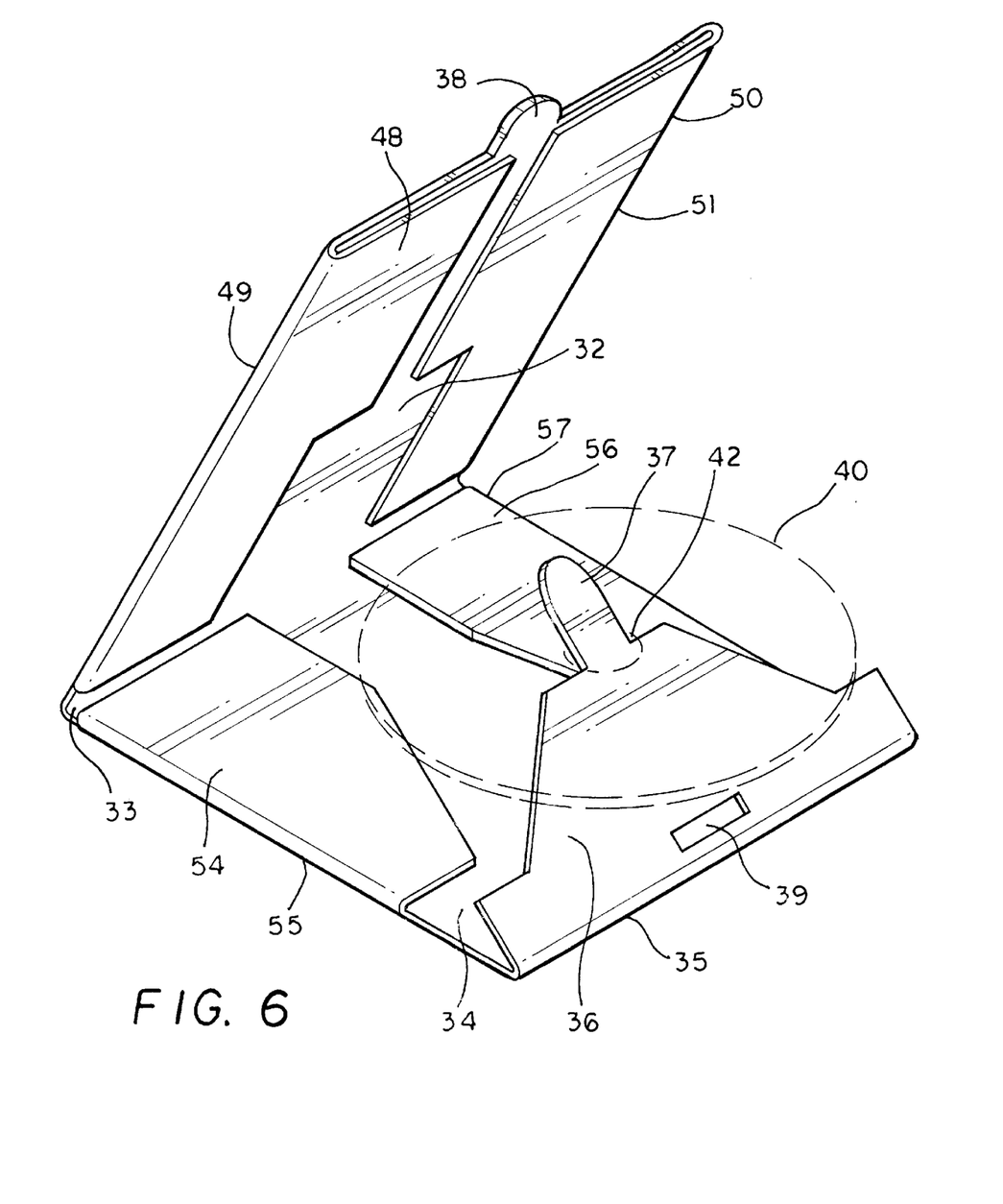
FIG. 6 is a perspective view of a third alternative embodiment of the disc container in the open position, with the glue flaps affixed to the base and lid, showing the edges of fold lines and a disc in broken lines.

FIG. 6 illustrates yet another embodiment of the present invention. Configured glue flaps 48 and 50 lie adjacent to arid in contact with the lid, along fold lines 49 and 51, respectively. Fold lines 49 and 51 separate, respectively, glue flaps 48 and 50 from the lid. Configured glue flaps 54 and 56 are lie adjacent to and in contact with the base, along fold lines 55 and 57 respectively. Fold lines 55 and 57 separate glue flaps 55 and 56, respectively, from the base.

Before usage of this embodiment of the invention, glue flaps 48 and 50 are rotated toward the inner surface of the lid, along fold lines 49 and 51 respectively. Glue is then used to secure the inner surface of glue flaps 48 and 50 to the inner surface of the lid. Glue flaps 54 and 56 are rotated toward the inner surface of the base, along fold lines 55 and 57. Glue is also used to secure the inner surface of glue flaps 54 and 56 to the inner surface of the base. Securing the glue flaps in place strengthens the lid and the base. Once the glue flaps are affixed to the base and the lid, this embodiment operates like the embodiment already described and illustrated in FIG. 3. To better accommodate the configured glue flaps, the member described as hexagonal in earlier embodiments possesses eight sides in this embodiment.

It is to be understood that the present invention is not limited to the embodiments described above, but encompasses any and all embodiments within the scope of the following claims.

I claim:

1. A container for holding a disc with a hole in the center, comprising:

a rectangular base for supporting a disc with a hole in the center;

a rectangular lid pivotally attached to a side of said base for movement between the open and closed positions; and     a segmented protruding member having an inner segment, a central segment and an outer segment;

said inner segment being pivotally attached to said base opposite the side at which the lid is attached, said inner segment having a width substantially wider than the central segment and the outer segment;

said central segment perpendicularly situated between the inner segment and the outer segment,         said outer segment having a rounded tip and width for insertion through the hole of the disc.

2. The container according to claim 1, wherein said base defines a circular recess, a rectangular recess abutting said circular recess and an oppositely opposed a D-shaped recess abutting said circular recess.

3. The container according to claim 1, wherein said container is comprised of a material selected from the group consisting of paperboard, plastic and a combination thereof.

4. A container for holding a disc with a hole in the center, comprising:

a rectangular base having at least a first fold line oppositely opposed to a second fold line;

a rectangular lid pivotally attached to said base along said first fold line;

a polygonal member selected from the group consisting of a hexagonal member and octagonal member, said polygonal member pivotally attached to said base along said second fold line; and a protruding member attached to said polygonal member opposite said second fold line, said protruding member has a rounded tip and width for insertion through the hole of the disc; and closure means.

5. The container according to claim 4 wherein said closure means comprises a protruding tab located on said lid opposite said first fold line and a slit located on said polygonal member parallel to said second fold line, wherein said tab is inserted into said slit for securing said lid to said polygonal member.

6. The container according to claim 4 further comprising a rectangular member pivotally attached to said lid along a third fold line.

7. The container according to claim 4 further comprising:

a first glue flap pivotally attached to said lid along a fourth fold line and an oppositely opposed second glue flap pivotally attached to said lid along a fifth fold line; and a third glue flap pivotally attached to said base along a sixth fold line and an oppositely opposed fourth glue flap pivotally attached to said base along a seventh fold line.

8. The container according to claim 4 wherein said container is comprised of paper.

* * * * *